(12) United States Patent
Karthaus

(10) Patent No.: US 9,051,978 B2
(45) Date of Patent: Jun. 9, 2015

(54) CLAMPING ROLLER FREEWHEEL FOR AN ADJUSTING DEVICE IN A MOTOR VEHICLE

(75) Inventor: Ulrich Karthaus, Remscheid (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 143 days.

(21) Appl. No.: 13/878,141

(22) PCT Filed: Oct. 4, 2011

(86) PCT No.: PCT/EP2011/067269
§ 371 (c)(1),
(2), (4) Date: Jun. 21, 2013

(87) PCT Pub. No.: WO2012/045714
PCT Pub. Date: Apr. 12, 2012

(65) Prior Publication Data
US 2013/0284555 A1  Oct. 31, 2013

(30) Foreign Application Priority Data

Oct. 8, 2010 (DE) .......................... 10 2010 047 748
Nov. 12, 2010 (DE) .......................... 10 2010 043 825

(51) Int. Cl.
*F16D 41/064* (2006.01)
*B60N 2/16* (2006.01)
(Continued)

(52) U.S. Cl.
CPC .............. *F16D 41/064* (2013.01); *B60N 2/169* (2013.01); *B60N 2/1896* (2013.01); *B60N 2/2227* (2013.01); *B60N 2/224* (2013.01);
(Continued)

(58) Field of Classification Search
CPC . F16D 43/02; F16D 2014/0665; B60N 2/169; B60N 2/2227; B60N 2/444; B60N 2/1896; B60N 2/224; B60N 2/4445

USPC .................................................... 192/45.004
See application file for complete search history.

(56) References Cited

U.S. PATENT DOCUMENTS

| | | | |
|---|---|---|---|
| 6,481,557 B2* | 11/2002 | Denis | 192/223.2 |
| 6,616,241 B1* | 9/2003 | Masuda et al. | 297/463.1 |
| 2008/0287244 A1 | 11/2008 | Liu | |
| 2009/0000902 A1* | 1/2009 | Gresley et al. | 192/223.2 |
| 2011/0203893 A1* | 8/2011 | Karthaus | 192/45 |

FOREIGN PATENT DOCUMENTS

| | | |
|---|---|---|
| DE | 195 40 631 C2 | 6/2001 |
| DE | 1020050 28 307 A1 | 12/2006 |

(Continued)

OTHER PUBLICATIONS

International Search Report received in connection with international application No. PCT/EP2011/067269; dtd Sep. 27, 2012.

*Primary Examiner* — Rodney H Bonck
(74) *Attorney, Agent, or Firm* — Foley & Lardner LLP

(57) ABSTRACT

A clamping roller freewheel for an adjusting device in a motor vehicle includes a cylindrical outer surface, at least one roller pair, an output shaft, a clamping element which is rotationally connected to the output shaft and which has at least one clamping slope on an opposite side of the roller pair to the cylindrical outer surface, and a spacer device which is at least partially between the rollers and has elastic properties. This spacer device includes a spacer piece and a spring. When the spacer piece is in the normal position, an oblique surface bears against a roller. The spring presses the spacer piece into the normal position in which it exerts a force on at least one roller. When passing from the normal position to the retracted position, the oblique surface is moved away from the roller.

11 Claims, 6 Drawing Sheets

Figure 1:
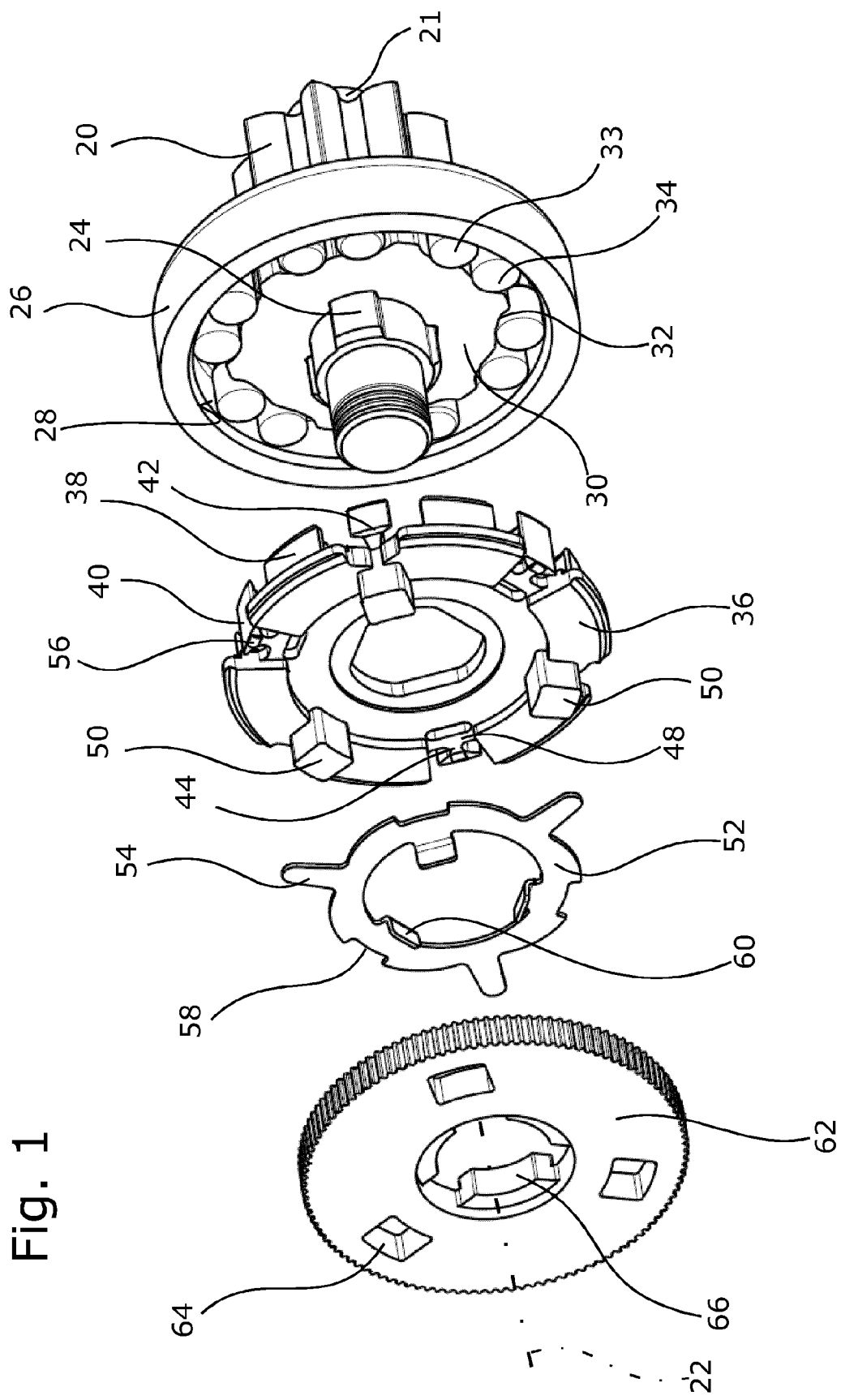

(51) Int. Cl.
*B60N 2/18* (2006.01)
*B60N 2/22* (2006.01)
*B60N 2/44* (2006.01)
*F16D 41/10* (2006.01)
*F16D 43/02* (2006.01)

(52) U.S. Cl.
CPC ............ *B60N 2/444* (2013.01); *B60N 2/4445* (2013.01); *F16D 41/105* (2013.01); *F16D 43/02* (2013.01)

(56) References Cited

FOREIGN PATENT DOCUMENTS

| | | |
|---|---|---|
| DE | 10 2009 28 213 | 2/2010 |
| DE | 10 2010 031 133 A1 | 8/2011 |
| EP | 0 497 007 A1 | 8/1992 |
| EP | 1 152 168 B1 | 12/2001 |
| EP | 1 411 203 A1 | 4/2004 |
| EP | 2 363 317 | 9/2011 |
| JP | 2001-140926 A | 5/2001 |

\* cited by examiner

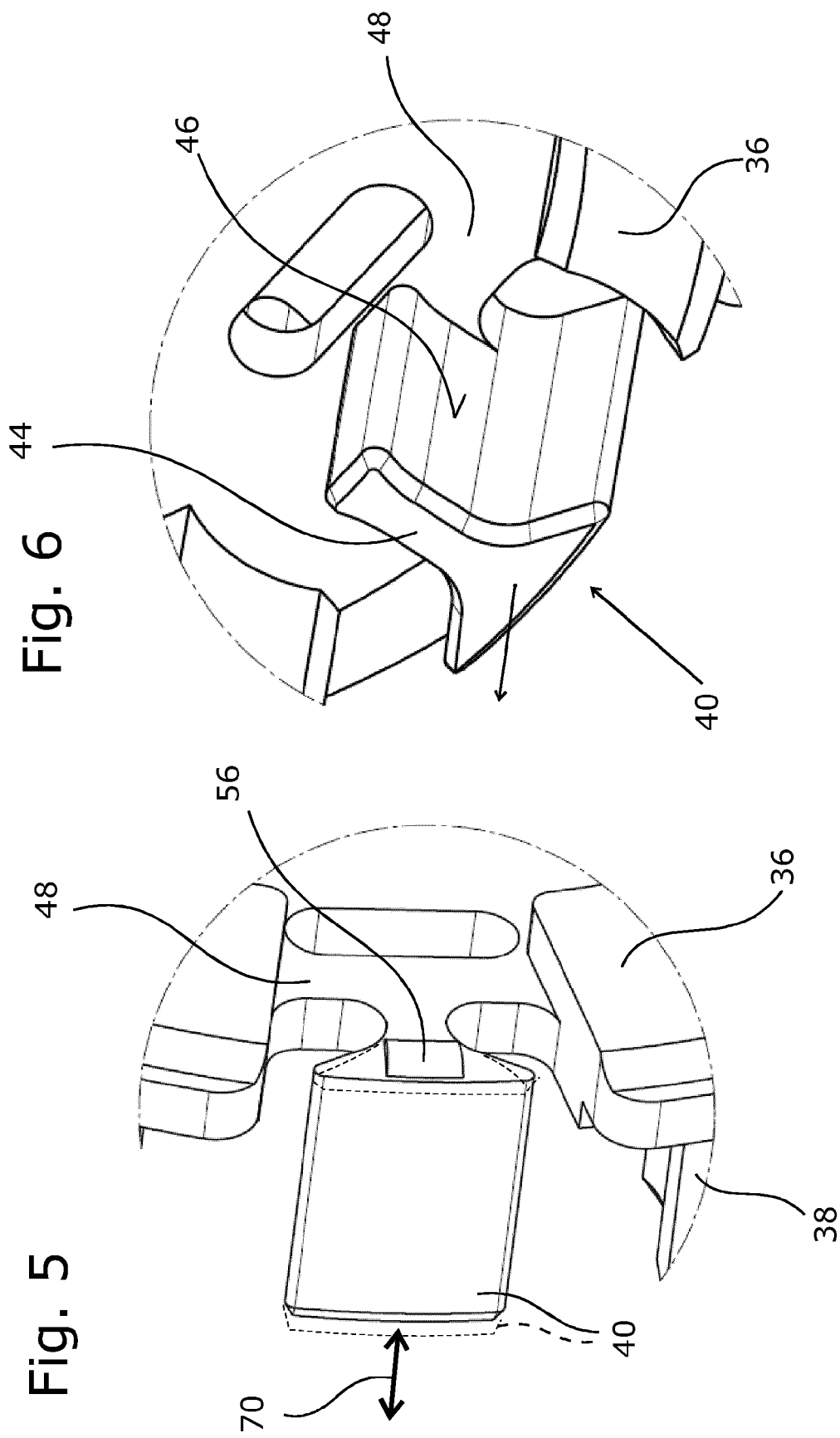

… (1)

CLAMPING ROLLER FREEWHEEL FOR AN ADJUSTING DEVICE IN A MOTOR VEHICLE

CROSS REFERENCE TO RELATED APPLICATIONS

The present application is a National Stage of International Application No. PCT/EP2011/067269 filed on Oct. 4, 2011, which claims the benefit of German Patent Application No. 10 2010 047 748.6 filed on Oct. 8, 2010, German Patent Application No. 10 2010 043 825.1 filed on Nov. 12, 2010, the entire disclosures of which are incorporated herein by reference.

The invention relates to a clamping roller freewheel for an adjusting device in a motor vehicle, in particular in a motor vehicle seat, the clamping roller freewheel comprises a cylindrical jacket surface defining an axis, at least one pair of rollers comprising a first and a second roller, an output shaft central relative to the axis, a clamping member which is rotationally connected to the output shaft, and which has a clamping contour for each roller which is located on a side of the roller pair opposite to the cylindrical jacket surface, and a spacing means which is at least partially located between the first and the second roller and has elastic properties.

Such a clamping roller freewheel is known from EP 497 007 A1. In this case, the clamping member is part of a housing. Such clamping roller freewheels are preferably used for step-by-step switching mechanisms as they are known, for example, from EP 1 152 168 B1 and DE 195 40 631 C2.

With regard to the further state of the art, reference is also made to DE 10 2009 028 213 A1; here, the cylindrical jacket surface is a cylindrical inner surface, and the inclined clamping surfaces are provided within this cylindrical inner surface. The cylindrical inner surface is a part of a housing.

In the case of such clamping roller freewheels, a locking moment that is as large as possible is desired; it is supposed to be greater than 60 Nm, with Hertz pressure being taken into account. The minimum ultimate moment is supposed to be greater than 200 Nm. It is another goal that, with the progress over the angle of rotation, the locking moment at first has a smaller gradient and then, above a certain angle of rotation, a larger gradient. Above a further angle of rotation, the clamping action is supposed to be maintained at as high and constant a level as possible, before permanent deformation or damage sets in.

The known clamping roller freewheel comprises n rollers. Half of them is responsible for one direction of rotation, the other half for the other direction of rotation. Therefore, the locking moment in one direction is only effected by half, n/2, of the rollers. The other half of the rollers is passive in this case. In order to increase the locking moment, the number n of the rollers in the clamping roller freewheel could be increased. However, an increase in the size of the clamping roller freewheel is not desired. The space in the clamping roller freewheel is limited.

There is the problem in known clamping roller freewheels that in the case of repeated load, they do not retain a clamping position that was assumed at one time. If the vehicle in which the vehicle seat equipped with the clamping roller freewheel is located travels over road bumps, or if the vehicle is exposed to similar alternating loads, then the first and the second rollers alternately assume a clamping position. Since the loads that act on the vehicle upwards in the z direction and the loads that act in a downward direction are generally different, this results in different loads in the two directions of rotation of the clamping roller freewheel. This in turn causes the paths of the first and the second rollers to be different; in each case, a micro-slip is produced that, over time, adds up to a run over the entire clamping roller freewheel. The z-direction extends perpendicular to the driving plane.

This is where the invention comes in. It has set itself the object of further developing the clamping roller freewheel of the kind mentioned in the introduction in such a way that it retains the angular position once assumed even in the case of alternating loads, i.e., that it does not readjust itself without any intervention from the user.

This object is achieved with a clamping roller freewheel with the features of claim 1.

At least some of the rollers are now no longer directly spring-mounted, but rather indirectly. The spacer is preferably made from a hard plastic material or a metal. Though it possesses a elasticity due to its material, however, this elasticity is at most 1%, preferably less, of the elasticity of the spacing means according to the prior art, which is configured, for example, as a rubber ball, helical spring or the like. The rollers are now spring-mounted by the spring pushing the spacer into the gap between the two rollers of the roller pair. The spacer comprises at least one inclined surface with which it normally rests against a roller; preferably, it has at least two such inclined surfaces with which it respectively rests against a roller of the roller pair. Given a radial sectional plane, this results in a V-shaped or X-shaped cross-sectional shape. In this case, the tip of the V points in the direction of the clamping contour. In this case, a tip does not have to be formed specifically, rather, the space can also expand again after a tapered portion. What is important, however, it that a tapered portion is provided due to the at least one inclined surface. During operation, the spring pushes against the spacer, the latter's inclined surface pushes an adjacent roller in the circumferential direction into the clamping position. If, conversely, the roller pushes against the inclined surface, the spacer is moved substantially against the action of the spring; it is, for example, pushed radially outwards or it is pivoted.

Thus, in contrast to the prior art, the rollers are spring-mounted via a spring and the spacer. The spring pushes against the spacer, the spacer pushes against at least one roller. In particular, it pushes the two rollers of a roller pair apart. In this case, the spring has a spring stroke that does not lie in the connecting line between the two rollers, but extends transversely thereto, for example axially. The spacer is movable. The spring force is deflected via the substantially rigid space, so that the required spring-mounted connection between the two rollers of the roller pair is finally accomplished.

Preferably, a single-piece spacer, which comes to rest against both rollers of the roller pair, is provided between a roller pair. However, it is also possible in an alternative to provide for each roller of the roller pair its own spacer and optionally also its own spring.

If a spacer is provided between the two rollers of the roller pair, this results in the following advantage: If one of the rollers pushes against the inclined surface and if the force acting in this case is so large that the force introduced via the spring is overcome, then the roller pushes the spacer out of the way, into the retracted position. Thus, the roller considered does not directly influence the other roller of the roller pair; the other roller is not moved, or in any case not moved if possible. This is in contrast to the prior art. If, in the prior art, the one roller moves towards the other roller, the spacing means is compressed so that a force is also transmitted onto the other roller. If separate spacers are provided for each roller, an influence on one roller by the other roller in the above-described sense is also prevented.

The spring is preferably made from metal. A material can be selected which has particularly good spring properties, for example spring bronze. Preferably, the spring is a constituent of a larger spring component, for example configured as a radially extending finger of this component.

Figure 2:
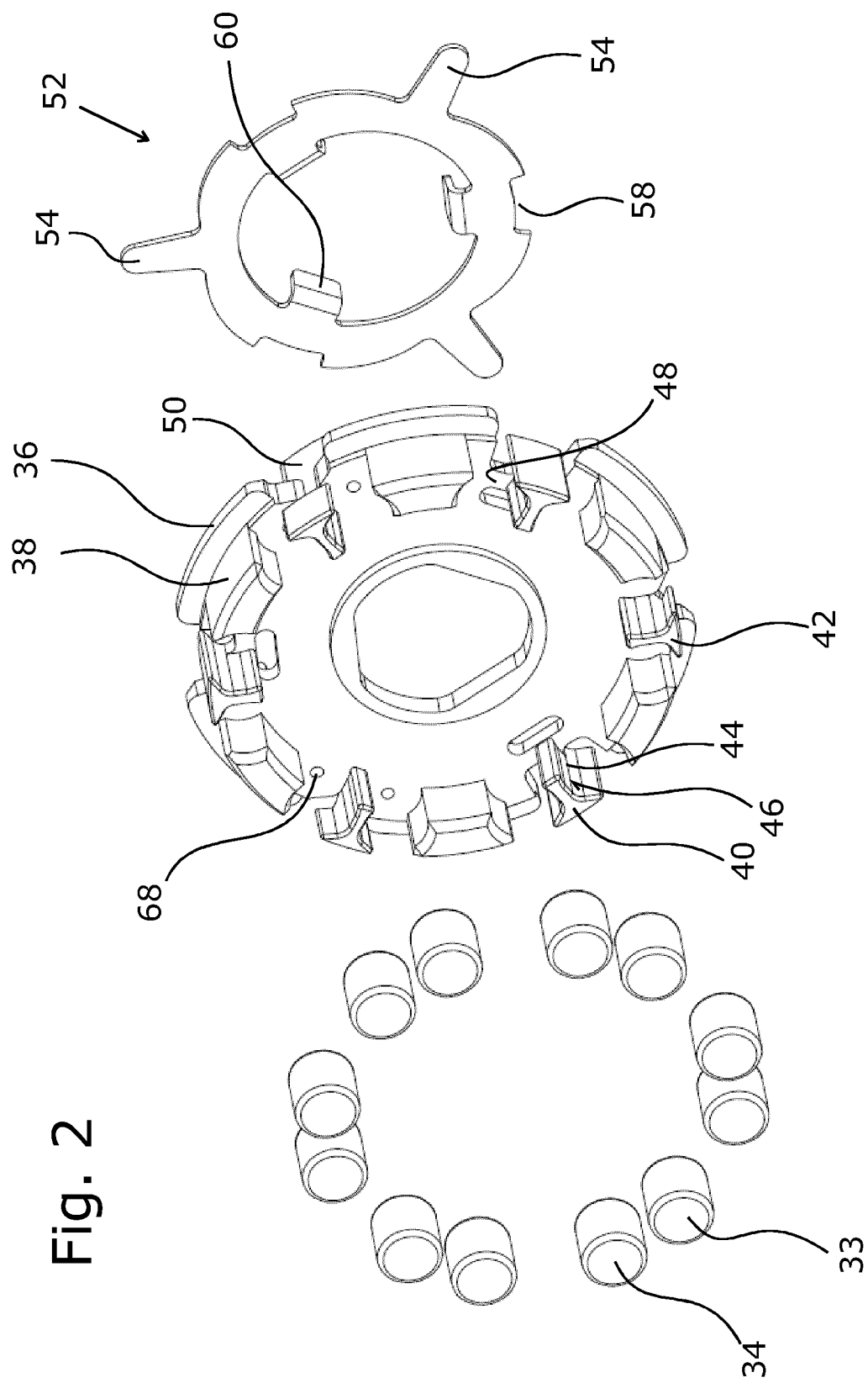
Figure 3:
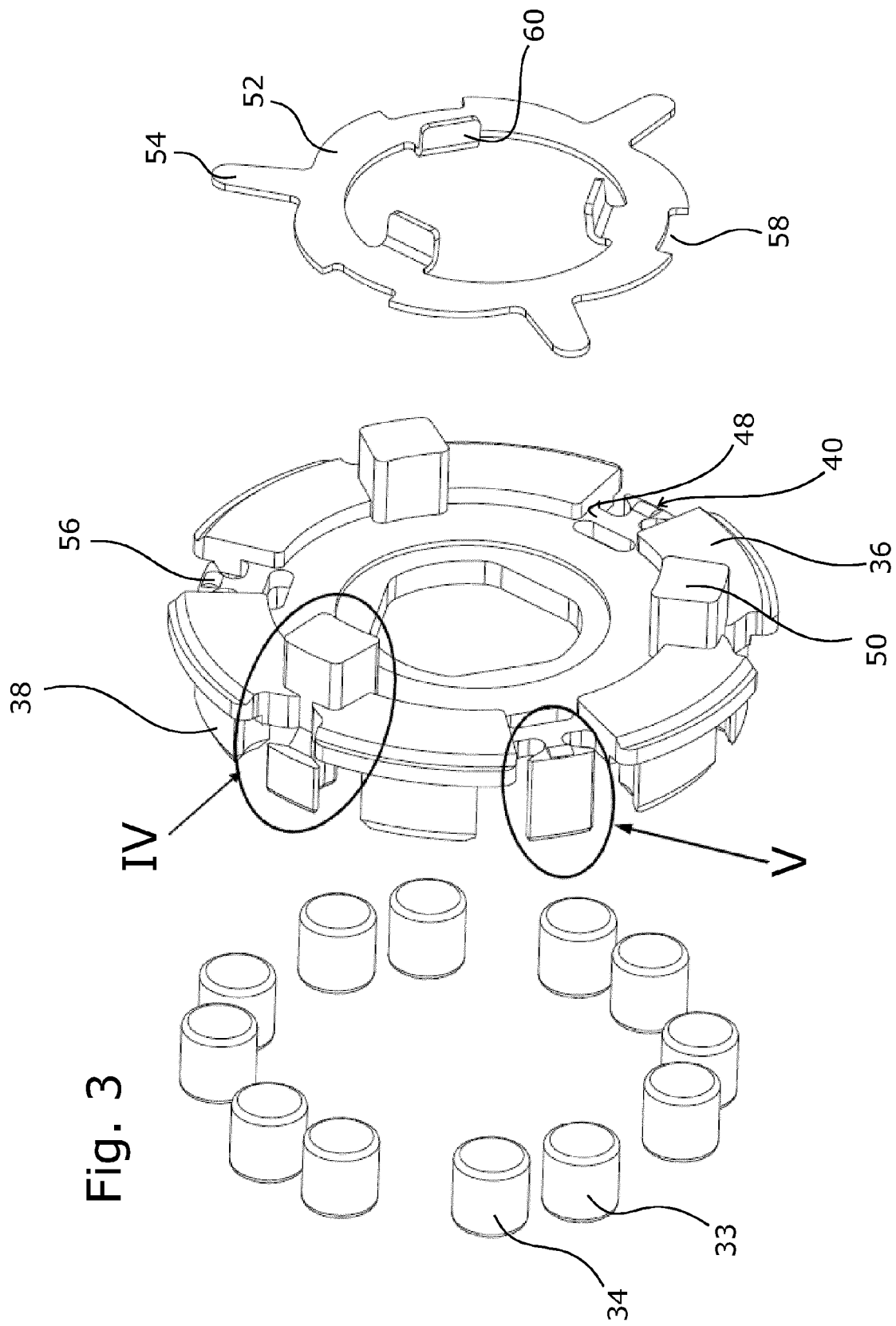
Figure 4:
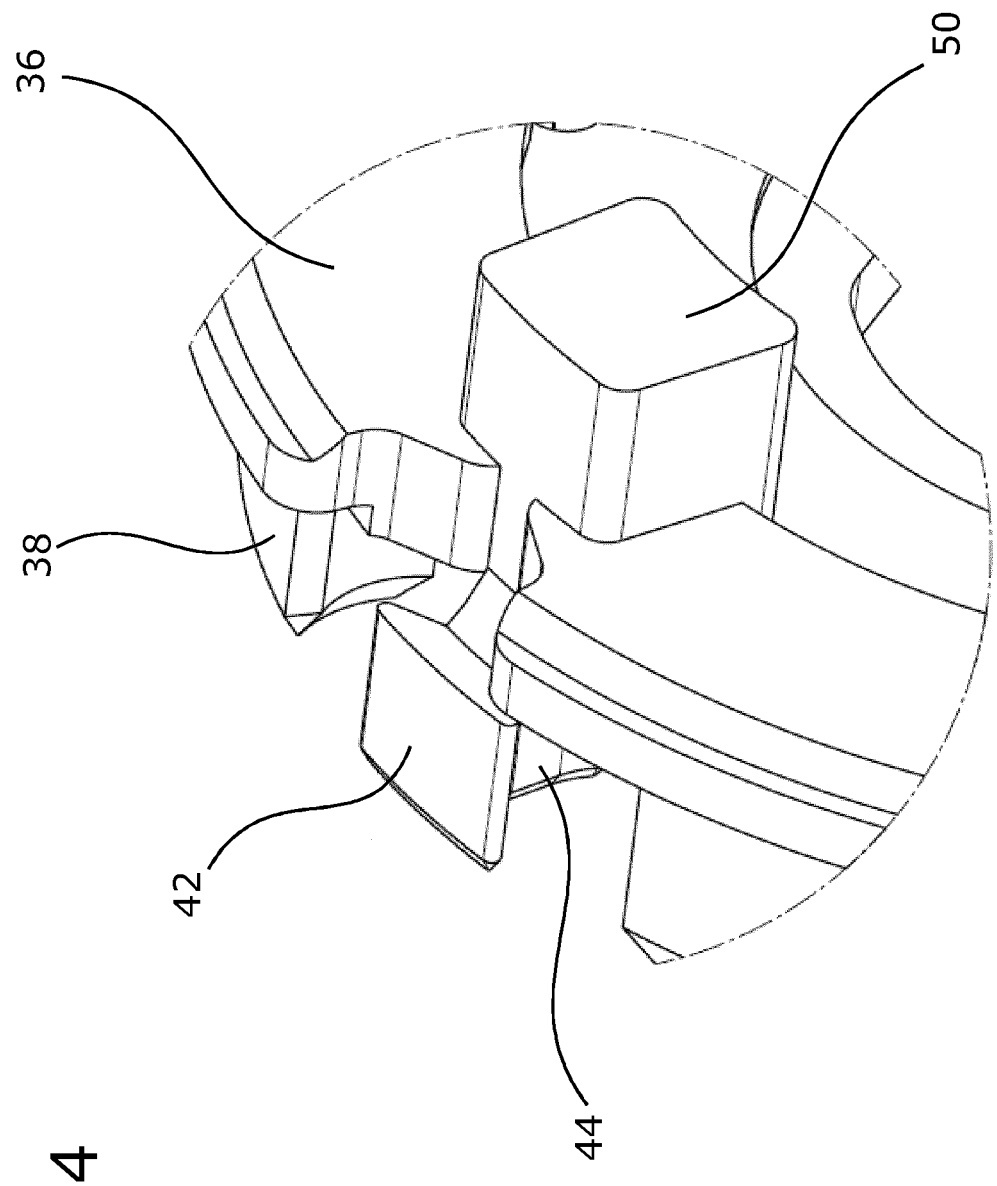
Figure 7:
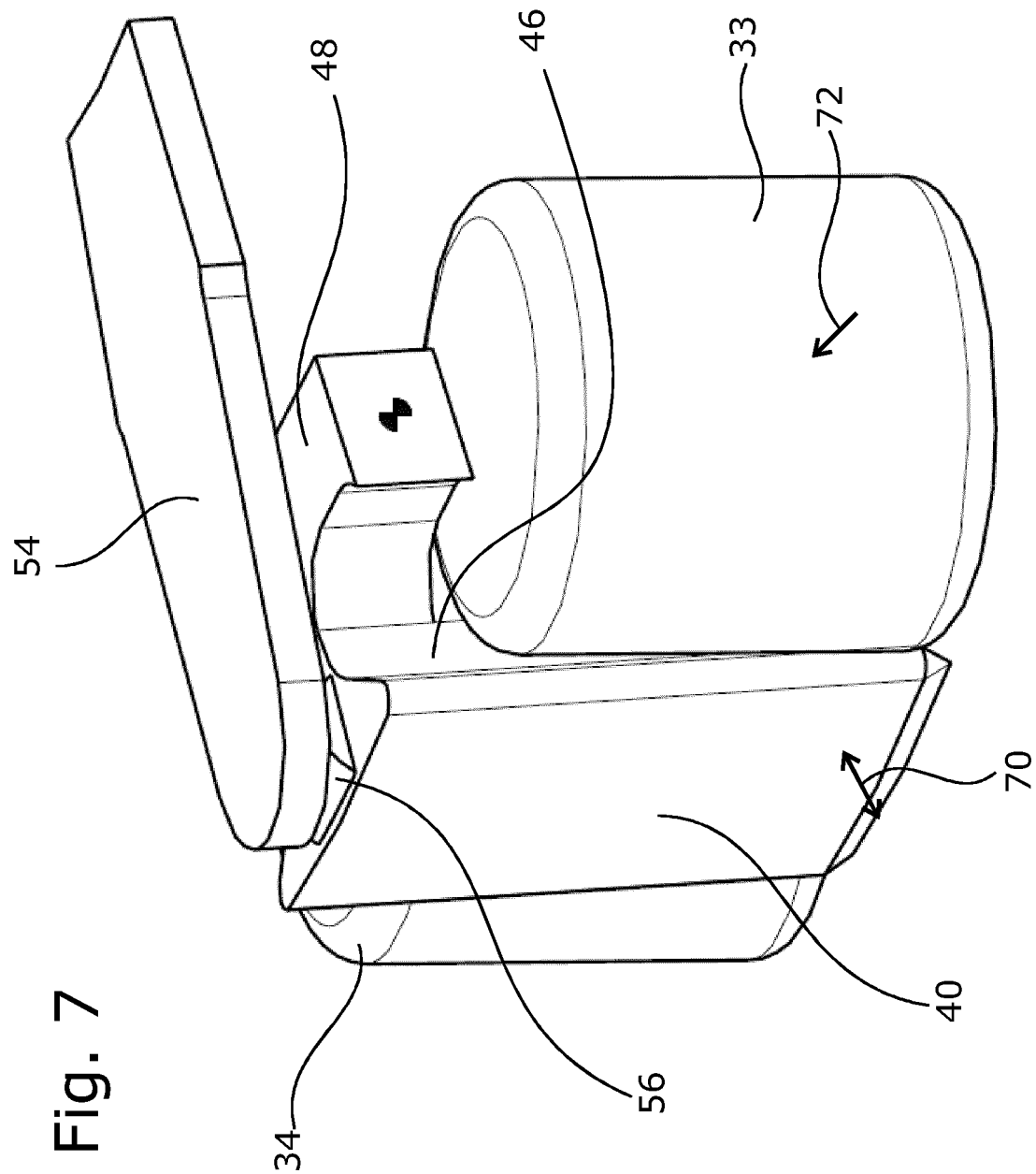

Other advantages and features of the invention become apparent from the other claims as well as from the following description of an exemplary embodiment of the invention, which shall be understood not to be limiting and which will now be described with reference to the drawing. In the drawing:

FIG. 1: shows a perspective assembly illustration of the essential parts of a clamping roller freewheel, FIG. 2: shows a perspective assembly illustration of three component groups from FIG. 1, i.e. a supporting part, the rollers and a spring component, seen in a viewing direction different from FIG. 1, FIG. 3: shows a perspective assembly illustration of three component groups from FIG. 2, but now seen in a viewing direction different from FIG. 2, FIG. 4: shows an enlarged representation detail IV from FIG. 3, FIG. 5: shows an enlarged representation detail V from FIG. 3, FIG. 6: shows the detail according to FIG. 5 seen in another viewing direction, and FIG. 7: shows a perspective view of a movable spacer element, of a roller pair and of a spring.

The clamping roller freewheel comprises a pinion 20 that is placed on an output shaft 21 and is rotatable about an axis 22. In the assembled state of the clamping roller freewheel, this pinion 20 protrudes freely on one side. The pinion 20 is connected to a spline profile 24 via a cylindrical collar portion. On the adjacent end portion, it has a threaded stub on which a securing means (not shown) can be attached that holds the clamping roller freewheel together and closes it. A housing 26 is in contact with the collar portion and is able to rotate about the collar portion with a bearing portion.

The housing 26 has a cylindrical jacket surface, which in this case is configured as a cylindrical inner surface 28; it is central relative to the axis 22. The housing 26 is cup-shaped; it is open in the direction facing away from the pinion 20. A clamping member 30 is inserted into the open space of the housing 26. It has a hole adapted to the spline profile 24, so that the clamping member 30 is non-rotatably connected to the pinion 20 and thus to the output shaft 21. The clamping member 30 has on its radial outer surface a number n of V-shaped arrangements. Each of the latter has a left and a right inclined clamping surface 32. The two V-shaped arrangements of a roller pair are disposed symmetrical to a radial. The radial outer surface of the clamping member 30 is disposed opposite to the inner surface 28. Roller pairs with a first roller 33 and a second roller 34 each are located therebetween.

The clamping roller freewheel has a total of n rollers 33, 34. It has n/2 first rollers 33 and n/2 second rollers 34. It has n/2 roller pairs. A roller 33 or 34 is allocated to each V-shaped arrangement 32. In the normal or initial state, the rollers 33, 34 of a roller pair are located on the spaced-apart inclined clamping surfaces 32 of their V-shaped arrangements. These inclined clamping surfaces 32 are hereinafter referred to as outer inclined clamping surfaces 32. In the initial state, the rollers 33, 34 therefore do not have any contact with the adjacent inclined clamping surfaces 32 of the V-shaped arrangements of a roller pair. These inclined clamping surfaces 32 are hereinafter referred to as inner inclined clamping surfaces 32.

In a preferred embodiment, the two V-shaped arrangements extend, with one outer and one inner inclined clamping surfaces 32, respectively, in the shape of a W. With regard to details, reference is made to DE 10 2010 002 314 A1. We incorporate the entire content of the disclosure of this specification into the content of the disclosure of the present application.

A supporting part 36, which interacts with the spline profile 24 just like the clamping member 30, is located, in the axial order, behind the housing 26 and the clamping member 30. While the clamping member 30 is connected to the spline profile 24 substantially in a slip-free manner, the supporting part 36 has an internal cut-out which interacts with the spline profile 24 in such a way that the supporting part 36 can be rotated about a free rotation angle of 5-25° until it, starting from one direction of rotation, and after changing the direction of rotation, again rests against the spline profile 24 in the other direction of rotation. The supporting part 36 is substantially disk-shaped; it covers the open side surface of the substantially cup-shaped housing 26. From the disk surface, a total of n/2 projections 38, all of which are constructionally identical, project towards the housing 26. In the assembled state, they are respectively located between a roller pair 33, 34. Furthermore, n/4 movable spacer elements 40 and n/4 fixed spacer elements 42 project in the same direction. One spacer element 40 or 42, respectively, is located between the two rollers 33, 34 of a roller pair. The movable spacer elements 40 and the fixed spacer element 42 are disposed alternately in the circumferential direction. The movable spacer elements 40 comprise a spacer 44 which is located directly between the two rollers 33, 34 of the roller pair and normally is in contact with them. This spacer 44 comprises two side surfaces; one side surface respectively faces one roller 33 or 34 and is normally in contact therewith. At least one side surface preferably comprises at least one, in particular two, inclined surfaces 46. Due to the at least one inclined surface 46, the spacer 44 is wedge-shaped; it tapers towards the clamping member 30 or towards the cylindrical inner surface 28. In an alternative, it can also taper in another direction, provided this direction extends transversely to the circumferential direction.

The movable spacer element 40 is connected to the rest of the supporting part 36 via a narrow material bridge 48. Towards the inside, this material bridge 48 is delimited by an elongated hole. The material bridge 48 acts as a hinge; the movable spacer element 40 can be moved relative to the rest of the supporting part 36 by moving the material bridge 48. This movement takes place in one direction of movement 70. In the exemplary embodiment, the movement is a pivoting movement; other movements are not excluded thereby. The movable spacer elements 40 differ from the fixed spacer elements 42 due to this movability.

Three dogs 50 project parallel to the axial direction on the other side of the disk of the supporting part 36.

Again seen in the sequence considered along the axis 22, a spring component 52 is located outside of the supporting part 36. It comprises an annular body, from which n/4 springs 54 project radially outwards that are resilient in the axial direction. They come into contact with heads 56 of the movable spacer elements 40. These heads 56 provide precisely defined contact points for the springs 54. For this purpose, they axially project slightly in the axial direction over the rest of the movable spacer element 44, e.g. by 0.5 to 2 mm.

The spring component 52 has three recesses 58 that interact with the dogs 50. Finally, it comprises three fingers 60 that protrude axially from the housing 26.

The final component within the indicated sequence is a release gear 62. It has an external gearing. It comprises three windows 64 into which the dogs 50 engage with an angular play. In this regard, reference is made to the aforementioned DE 10 2010 002 314 A1. Finally, it has three jaws 66 that arrive between the projections of the spline profile 24 and establish a rotational connection with rotational play therewith.

The fingers 60 interact with the spline profile 24 and/or with the jaws 66. The springs 54 are preferably bent at an angle between 2 and 15° out of the plane of the ring of the spring component 52. In the case of an axial assembly, they come into contact with the heads 56 with their free ends first.

FIG. 4 shows a fixed spacer element 42 and the region around it on a larger scale. The FIGS. 5 to 7 show a movable spacer element 40 and its surroundings in a larger scale and in different viewing directions.

In the exemplary embodiment, n=12. Other values of the total number n of rollers 33, 34 are possible, for example 10, 14 and 16. Preferably, n is a number that is divisible by four. Preferably, n is an even number.

Small, knob-like bearing projections 68 are provided on the disk body of the supporting part 36; they have an approximate diameter of 0.5 to 2 mm and a height of 0.2 to 0.8 mm. They are disposed where the centerline of a roller 33, 34 is normally located and define a preferred axis of rotation for this roller.

The function is as follows: The respective spring-mounted movable spacer element 40 is pushed downwards by the spring 54; it thus arrives in a displaced position; this is shown in dashed lines in FIG. 5; additionally, it is shown in FIG. 7. This is referred to as the normal position. If a pressure is exerted on the spacer 44 in the circumferential direction, the movable spacer element 40 increasingly moves along the direction of movement 70 into a retracted position; this is shown in FIG. 5 with continuous lines and not at all in FIG. 7. When the spring force is entirely compensated by the pressure, the movable spacer element 40 is in the retracted position. This is also the position which the movable spacer element 40 has during the production of the supporting part 36 and prior to assembly.

In the normal position, the spacer 44 is positioned slightly obliquely relative to the axis 22, as is apparent from FIG. 7. The rollers 33, 34 have a roller axis extending parallel to the axis 22. If one of the rollers 33 or 34 now pushes against the spacer 44, as this is indicated in FIG. 7 by an arrow 72, the spacer 44 is moved outwards in the direction of movement 70, i.e. more or less into the retracted position. Thus, the effective thickness of the spacer 44, which is located between the two rollers, 33, 34, is now less. The effective thickness decreases progressively as the retracted position is assumed progressively. In other words, the rollers 33, 34 can now come closer to one another than before.

The above-described movement of the spacer 44 outwards in the direction of movement 70 is accomplished by the at least one inclined surface 46, against which the roller rests. Under the pressure from the roller, the inclined surface 46 slips outwards. A movement of the spacer 44 in the circumferential direction is prevented by the material bridge 48 virtually only permitting a pivoting of the movable spacer element about an axis extending in the circumferential direction.

This means that, given a pressure on the roller 33 in the direction of the arrow 72, the movable spacer element 40 moves outwards in the direction of movement 70; thus, the material thickness of the spacer 44 between the two rollers 33 and 34 decreases. During this process, no pressure is at first exerted on the other roller 34. In contrast to the prior art, the spacer 44 thus moves "out of the way", it becomes thinner; thereby, the movement in the direction of the arrow 72 of the roller 33 does not affect the other roller 34.

The angle that the inclined surface 46 includes with the direction of movement 70 is less than 90 degrees and greater than the angle of the self-locking action between the materials used for the roller and the spacer 44.

Instead of rollers 33, 34, other rolling elements, such as, for example, drum-shaped rolling elements, balls or the like can be used. The spacer 44, particularly its at least one inclined surface 46, has to be adapted to the respective shape of the rolling element.

The entire supporting part 36 is also pushed against the housing 26 by the spring component 52. The geometry is selected in such a way that this force is also used to clamp the rollers 33, 34 axially; they are pushed against the bottom of the housing 26. This is done via the bearing projection 68.

The roller pairs between which a fixed spacer element 42 is located are not spring-mounted towards the clamping gap, i.e. towards the outer inclined clamping surface 32, by a spring 54 or another component. The rollers of these n/4 roller pairs—three roller pairs in the exemplary embodiment—normally lie in the middle of their two inclined clamping surfaces 32, which are disposed in a V-shape. After a certain angle of rotation between the pinion 20 and the housing 26, for example after 1.4 degrees, these rollers are clamped. In the prior art, this is not the case in at least half of these rollers, for which a significantly larger angle, for example 3.3 degrees, is required for a clamping action to be provided.

Of the roller pairs allocated to a movable spacer element 40, one roller of the roller pair, respectively, is directly and immediately clamped in the clamping roller freewheel according to the invention. After an angle of rotation of 1.4 degrees, n/2 rollers are added to that; the final n/4 rollers are added after an angle of rotation of 3.3 degrees.

Independent of the configuration of the movable spacer elements, the applicant reserves the right to prosecute as an invention, independent of the teaching of claim 1, a clamping roller freewheel which spring-mounts only some roller pairs in a clamping position via a spacing means, and which otherwise comprises fixed spacer elements 42 as they were described above.

The applicant reserves the right to combine features and also sub-features of individual claims and/or of individual sentences of the description in any way, even if such a combination is not immediately apparent from the context.

The invention claimed is:

1. A clamping roller freewheel for an adjusting device in a motor vehicle, the clamping-roller freewheel comprises:
   a cylindrical jacket surface that defines an axis,
   at least one pair of rollers comprising a first roller and a second roller,
   an output shaft that is central relative to the axis,
   a clamping member which is rotationally connected to the output shaft, and which has at least one inclined clamping surface which is located on a side of the roller pair opposite to the cylindrical jacket surface, and
   a spacing device which is at least partially located between the first and the second roller and has elastic properties,
   wherein the spacing device comprises a spacer and a spring, the spacer is disposed between the first roller and the second roller, can be moved between a normal position and a retracted position in a direction of movement extending transversely to the circumferential direction, and comprises at least one inclined surface, that, in the normal position of the spacer, the inclined surface rests against a roller, that during the transition from the normal position into the retracted position the inclined surface is removed from the roller, and that the spring biases the spacer into the normal position in which it exerts a force on at least one roller in the circumferential direction.

2. The clamping roller freewheel according to claim 1, wherein the inclined surface includes an angle of less than 90 degrees with the direction of movement.

3. The clamping roller freewheel according to claim 1, wherein the spring is located outside of the intermediate space between the first and the second roller.

4. The clamping roller freewheel according to claim 1, wherein several roller pairs are provided, and the spacing device comprising the spacer and the spring is allocated to only some of these several roller pairs.

5. The clamping roller freewheel according to claim 1, wherein a supporting part is provided, and the spacer is formed by this supporting part.

6. The clamping roller freewheel according to claim 5, wherein at least one movable spacer element is provided which forms the spacer and which is connected to the rest of the supporting part in a pivotable manner about an axis extending parallel to the circumferential direction.

7. The clamping roller freewheel according to claim 1, wherein the spring pushes against the spacer with a force component extending in the axial direction.

8. The clamping roller freewheel according to claim 1, wherein a double clamping contour with a left and a right inclined clamping surface is allocated to at least one of the two rollers, wherein a clamping action arises due to the cooperation of the roller either with the left or right inclined clamping surface, depending on the direction of rotation, and the cylindrical jacket surface.

9. The clamping roller freewheel according to claim 1, wherein the spacing device and the spring are separate components.

10. The clamping roller freewheel according to claim 1, wherein the spacer, under the action of the spring, pushes against the adjacent roller in such a way that the latter is loaded at an angle to the circumferential direction and is pushed more strongly in the direction towards the inclined clamping surface and less in the direction towards the cylindrical jacket surface.

11. The clamping roller freewheel according to claim 1, wherein the inclined surface includes an angle of less than 90 degrees with the direction of movement, and the apex of this angle points towards the clamping member.

* * * * *